US009450717B2

(12) United States Patent
Fu et al.

(10) Patent No.: US 9,450,717 B2
(45) Date of Patent: Sep. 20, 2016

(54) METHOD FOR CHANGING TDD UPLINK AND DOWNLINK CONFIGURATION

(71) Applicant: Samsung Electronics Co., Ltd., Gyeonggi-do (KR)

(72) Inventors: Jingxing Fu, Beijing (CN); Chengjun Sun, Beijing (CN)

(73) Assignee: Samsung Electronics Co., Ltd (KR)

( * ) Notice: Subject to any disclaimer, the term of this patent is extended or adjusted under 35 U.S.C. 154(b) by 121 days.

(21) Appl. No.: 14/369,987

(22) PCT Filed: Dec. 26, 2012

(86) PCT No.: PCT/KR2012/011489
§ 371 (c)(1),
(2) Date: Jun. 30, 2014

(87) PCT Pub. No.: WO2013/100581
PCT Pub. Date: Jul. 4, 2013

(65) Prior Publication Data
US 2014/0369221 A1    Dec. 18, 2014

(30) Foreign Application Priority Data

Dec. 28, 2011  (CN) .......................... 2011 1 0447885

(51) Int. Cl.
*H04L 5/14*       (2006.01)
*H04L 5/00*       (2006.01)
(Continued)

(52) U.S. Cl.
CPC ........... *H04L 5/0032* (2013.01); *H04B 7/2656* (2013.01); *H04L 5/006* (2013.01); *H04L 5/0044* (2013.01); *H04L 5/0073* (2013.01); *H04L 5/0094* (2013.01); *H04L 5/0096* (2013.01); *H04L 5/14* (2013.01); *H04L 5/1469* (2013.01); *H04W 24/02* (2013.01); *H04L 5/0035* (2013.01); *H04W 24/10* (2013.01)

(58) Field of Classification Search
None
See application file for complete search history.

(56) References Cited

U.S. PATENT DOCUMENTS

2007/0081489 A1*  4/2007  Anderson ............. H04W 16/14
                                                    370/329
2012/0287875 A1* 11/2012  Kim ...................... H04L 5/0048
                                                    370/329

(Continued)

FOREIGN PATENT DOCUMENTS

KR    1020090090824    8/2009
KR    1020090102419    9/2009

(Continued)

OTHER PUBLICATIONS

PCT/ISA/237, Written Opinion issued on PCT/KR2012/011489.

(Continued)

*Primary Examiner* — Sulaiman Nooristany
(74) *Attorney, Agent, or Firm* — The Farrell Law Firm, P.C.

(57) ABSTRACT

The present invention provides a method for changing TDD uplink and downlink configuration, including: UE measures interference from the adjacent cells' UE and reports an interference condition to an eNB; the eNB changes current TDD uplink and downlink configuration according to the interference condition reported by the UE and the current uplink and downlink service requirements. By the present invention, the dynamically changed uplink and downlink service load requirements may be adapted when there is no serious interference between adjacent cells.

22 Claims, 3 Drawing Sheets

(51) Int. Cl.
*H04B 7/26* (2006.01)
*H04W 24/02* (2009.01)
*H04W 24/10* (2009.01)

(56) References Cited

U.S. PATENT DOCUMENTS

| | | | |
|---|---|---|---|
| 2014/0050107 A1* | 2/2014 | Charbit | H04W 72/1289 370/252 |
| 2014/0153535 A1* | 6/2014 | Lei | H04L 1/1861 370/329 |
| 2014/0160967 A1 | 6/2014 | Gao et al. | |
| 2014/0313925 A1* | 10/2014 | Seo | H04L 41/0816 370/252 |
| 2014/0321313 A1* | 10/2014 | Seo | H04J 11/00 370/252 |
| 2014/0348015 A1* | 11/2014 | Seo | H04W 24/10 370/252 |

FOREIGN PATENT DOCUMENTS

| | | |
|---|---|---|
| KR | 1020110053920 | 5/2011 |
| KR | 1020110097623 | 8/2011 |
| WO | WO 2009/100371 | 8/2009 |
| WO | WO 2012/167431 | 12/2012 |

OTHER PUBLICATIONS

PCT/ISA/210, Search Report issued on PCT/KR2012/011489.

3rd Generation Partnership Project, Technical Specification Group Radio Access Network, Evolved Universal Terrestrial Radio Access (E-UTRA), TDD Home eNode B (HeNB) Radio Frequency (RF) requirements analysis (Release 9), 3GPP TR 36.922 V9.0.0, Apr. 2010.

3rd Generation Partnership Project, LTE; Evolved Universal Terrestrial Radio Access (E-UTRA), TDD Home eNode B (HeNB) Radio Frequency (RF) requirements analysis (3GPP TR 36.922 Version 9.0.0 Release 9, ETSI TR 136 922 V9.0.0, Apr. 2010, 78 pages.

European Search Report dated Jul. 23, 2015 issued in counterpart application No. 12863197.5-1851, 7 pages.

* cited by examiner blank sub-frame or almost blank sub-frame

METHOD FOR CHANGING TDD UPLINK AND DOWNLINK CONFIGURATION

PRIORITY

This application is a National Phase entry of PCT/KR2012/011489, which was filed on Dec. 26, 2012, and claims priority under 35 U.S.C. §119(a) to Chinese Patent Application No. 201110447885.6, filed on Dec. 28, 2011, the content of each of which is incorporated herein by reference.

TECHNICAL FIELD

The present invention relates to radio communication technologies, and more particularly to a method for changing TDD uplink and downlink configuration.

BACKGROUND ART

A Long Term Evolved (LTE) system supports Frequency Division Duplex (FDD) and Time Division Duplex (TDD). FIG. 1 shows the frame structure of a TDD system. In the TDD system, the length of each radio frame is 10 ms, and each radio frame is divided into two half frames with the length of 5 ms. Each half frame contains 8 time slots with the length of 0.5 ms and 3 special domains. The 3 special domains contain a Downlink Pilot Time Slot (DwPTS), a Guard Partition (GP) and an Uplink Pilot Time Slot (UpPTS), and the total length of the 3 special domains is 1 ms. Each sub-frame is composed of two continuous time slots, i.e., the kth sub-frame contains a time slot 2k and a time slot 2k+1. The TDD system supports 7 kinds of uplink and downlink configuration, as shown in Table 1. "D" in Table 1 indicates downlink sub-frames, "U" indicates uplink sub-frames, and S indicates special sub-frames containing the above 3 special domains.

TABLE 1

| configuration serial number | conversion point period | sub-frame number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 10 ms | D | S | U | U | U | D | S | U | U | D |

Table 1 is uplink and downlink configuration of LTE TDD.

Theoretically, each cell may adopt TDD uplink and downlink configuration different from that adopted by adjacent cells to adapt diversification of services. Practically, if adjacent cells adopt different TDD uplink and downlink configuration, uplink transmission and downlink transmission of adjacent cells will be interfered with each other, which will be illustrated hereinafter referring to FIG. 2.

FIG. 2 is a schematic diagram illustrating interference between adjacent cells adopting different TDD uplink and downlink configuration in the prior art. In FIG. 2, a sub-frame 3 of macro eNB is an uplink sub-frame, and a sub-frame 3 of micro eNB is a downlink sub-frame. On one hand, the downlink data transmission of the micro eNB will interfere with uplink data which is transmitted by all terminals of the macro eNB to the macro eNB, and the closer the distance from the micro eNB to the macro eNB, the more serious the interference is; on the other hand, the uplink data which is transmitted by the terminals of the macro eNB will seriously interfere with downlink data transmitted by terminals of the micro eNB which is closer to the terminals of the macro eNB.

In order to avoid the interference between uplink transmission and downlink transmission of adjacent cells in the TDD system, the adjacent cells adopt the same TDD uplink and downlink configuration at present. However, uplink services and downlink services of different cells are unbalanced, i.e., a certain cell has more uplink services and adjacent cells of the cell have more downlink services. In this case, different cells need to adopt different TDD uplink and downlink configuration to meet respective service requirements. The above two kinds of requirements are inconsistent, and thus a problem to be solved by the present invention is to change current TDD uplink and downlink configuration without influencing the interference between adjacent cells, so as to meet the load requirements of diversified uplink and downlink services.

DISCLOSURE OF INVENTION

Technical Problem

The present invention has been made to address at least the above problems and/or disadvantages and to provide at least the advantages described below. Accordingly, an aspect of the present invention provides a method for changing TDD uplink and downlink configuration

Solution to Problem

The present invention provides a method for changing TDD uplink and downlink configuration, which can change current TDD uplink and downlink configuration without influencing the interference between adjacent cells, so as to meet the load requirements of diversified uplink and downlink services.

A method for changing TDD uplink and downlink configuration includes:

a) receiving, by User Equipment (UE), an interference measurement control message of adjacent cells from an evolved NodeB (eNB), wherein the interference measurement control message of adjacent cells indicates a sub-frame on which interference measurement is to be performed;

b) measuring, by the UE, interference of the adjacent cells' UE on the sub-frame;

c) transmitting, by the UE, an interference measurement report to the eNB;

d) receiving, by the UE, a signaling of changing TDD uplink and downlink configuration from the eNB; and e) receiving and transmitting, by the UE, data according to new TDD uplink and downlink configuration indicated by the signaling.

The interference measurement control message of adjacent cells contains a sub-frame number for indicating the sub-frame on which interference measurement is to be performed, or contains the new TDD uplink and downlink configuration for indicating the sub-frame on which interference measurement is to be performed.

The sub-frame on which interference measurement is to be performed is an uplink sub-frame in current TDD uplink and downlink configuration and is a downlink sub-frame in the new TDD uplink and downlink configuration.

The step b) comprises:

configuring, by the UE, self as a receiving mode on the sub-frame on which interference measurement is to be performed, and measuring the interference of adjacent cells.

The UE measures a Receiving Signal Strength Indicator (RSSI) in whole receiving bandwidth.

In the step c), the interference measurement report transmitted by the UE to the eNB is an event-drive report or a periodical report.

In the step d), the signaling of changing the TDD uplink and downlink configuration received from the eNB by the UE is a physical layer signaling or a high layer signaling.

The eNB is a Pico eNB or a Home eNB;

after the step c) and before the step d), the method further comprises:

transmitting, by the eNB, a request of configuring a blank sub-frame or an Almost Blank Sub-frame (ABS) to adjacent macro eNBs, and transmitting the signaling of changing the TDD uplink and downlink configuration to the UE after receiving a request ACK message from the macro eNB.

The eNB is a Pico eNB or a Home eNB;

after the step c) and before the step d), the method further comprises:

transmitting, by the eNB, a request of changing the TDD uplink and downlink configuration to adjacent macro eNBs, wherein the request contains the new TDD uplink and downlink configuration, and transmitting the signaling of changing the TDD uplink and downlink configuration to the UE after receiving a request ACK message from the macro eNB.

As can be seen from the above technical solution, in the method for changing TDD uplink and downlink configuration, the UE measures interference of adjacent cells' UE with the UE, and reports an interference condition to the eNB, so that the eNB can learn the current interference of adjacent cells' UE with the UE, and can change the TDD uplink and downlink configuration according to the interference condition reported by the UE and current uplink and downlink service requirements. As can be seen, in the method of the present invention, through measuring the interference of adjacent cells, the UE can identify a scenario in which there is no serious interference of adjacent cells, so as to change the TDD uplink and downlink configuration in the scenario in which there is no serious interference of adjacent cells, and further avoid serious interference between the uplink transmission and downlink transmission of adjacent cells.

Based on the above technical solution, the interference measurement report reported by the UE may be taken as a reference by the eNB to determine whether to transmit a request of configuring a blank sub-frame or an Almost Blank Sub-frame (ABS) to adjacent eNBs, so as to notify the adjacent eNBs to configure a sub-frame which may result in the interference between uplink transmission and downlink transmission as a blank sub-frame or an ABS. In this way, interference between uplink transmission and downlink transmission of adjacent cells may be avoided after the eNB changes the TDD uplink and downlink configuration.

Besides, the interference measurement report reported by the UE may be taken as a reference by the eNB to determine whether to transmit a request of changing TDD uplink and downlink configuration to adjacent eNBs, so as to notify the adjacent eNBs to measure the signal strength of the eNB, and evaluate the interference between the uplink transmission and downlink transmission of adjacent cells after the eNB changes the TDD uplink and downlink configuration. When the interference is not serious, the eNB may change the TDD uplink and downlink configuration, so as to avoid the interference between the uplink transmission and downlink transmission of adjacent cells after the eNB changes the TDD uplink and downlink configuration.

Advantageous Effects of Invention

Advantages, and salient features of the invention will become apparent to those skilled in the art from the following detailed description, which, taken in conjunction with the annexed drawings, discloses exemplary embodiments of the invention.

MODE FOR THE INVENTION

In order to make the object, technical solution and merits of the present invention clearer, the present invention will be illustrated in detail hereinafter with reference to the accompanying drawings and specific embodiments.

In the TDD system, it is supposed that adjacent eNBs adopt different TDD uplink and downlink configuration. That is to say, the eNB may dynamically adjust the TDD uplink and downlink configuration according to the load condition of uplink and downlink services of current cell, so as to meet the load requirements of uplink and downlink services.

Figure 1:
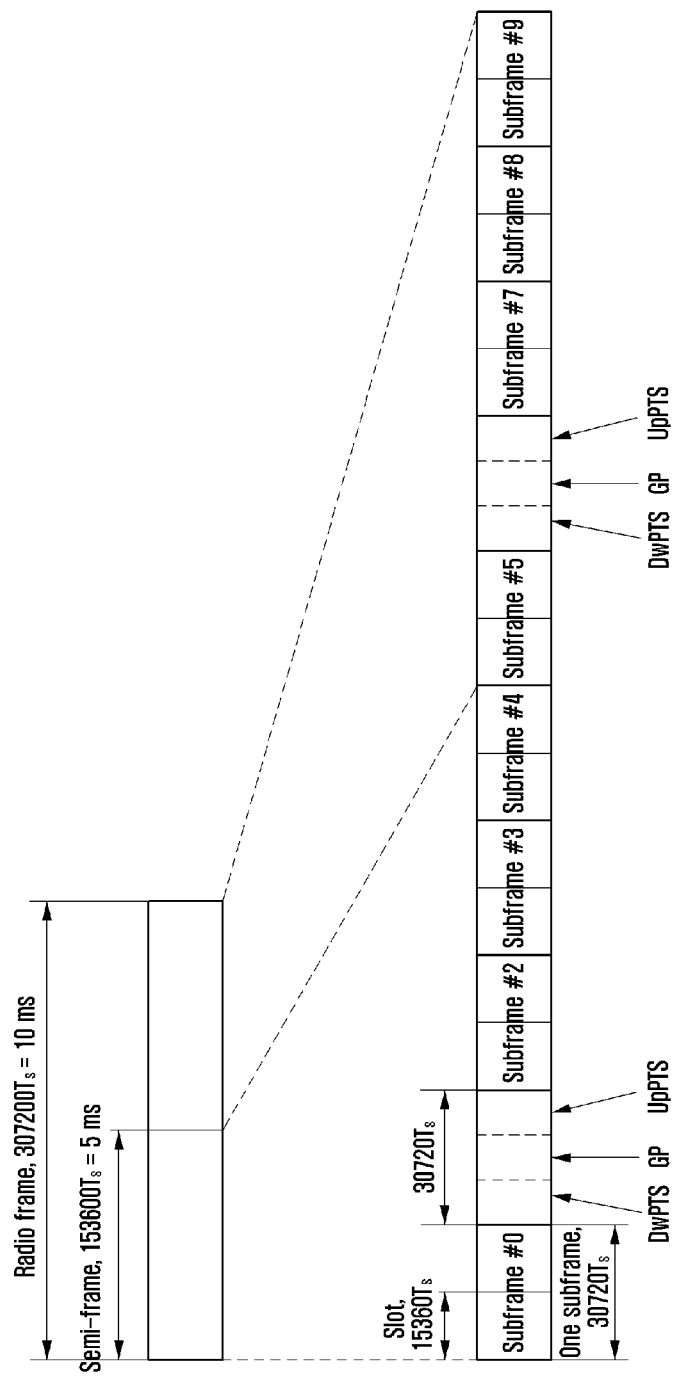
FIG. 1 is a schematic diagram illustrating the frame structure of a TDD system in the prior art.
Figure 2:
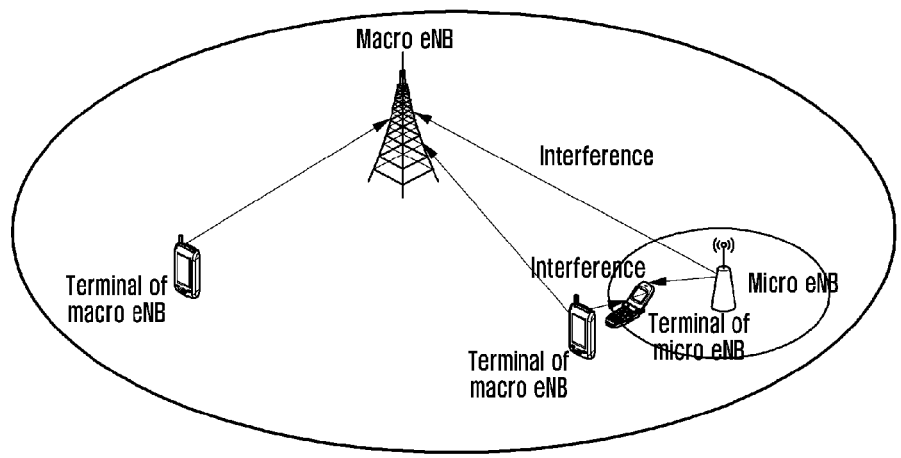
FIG. 2 is a schematic diagram illustrating interference between adjacent cells adopting different TDD uplink and downlink configuration in the prior art.
Figure 2:
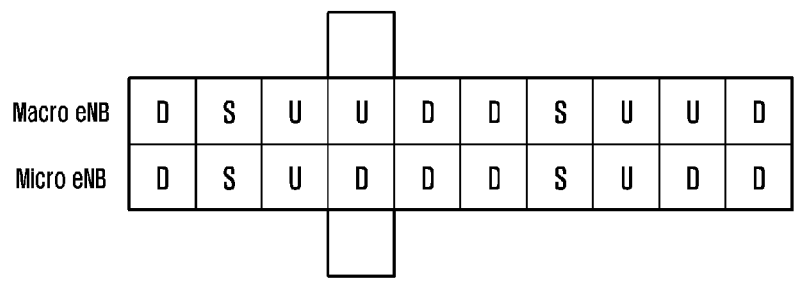
Figure 3:
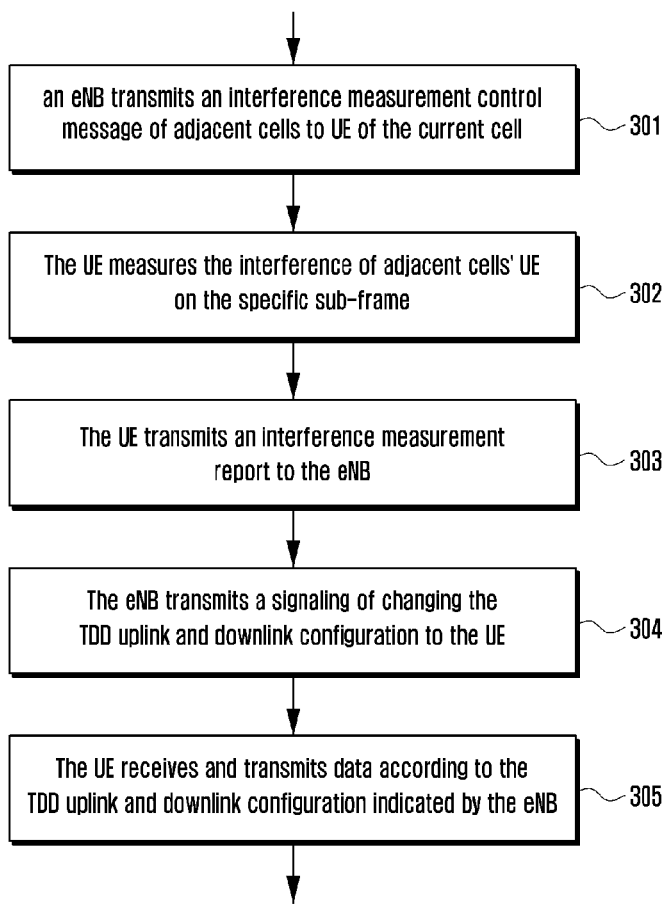
FIG. 3 is a flowchart illustrating a method for changing TDD uplink and downlink configuration according to an embodiment of the present invention.

FIG. 3 shows the processes of a method provided by the present invention.

Block 301: an eNB transmits an interference measurement control message of adjacent cells to UE of the current cell, to indicate the UE to measure the interference of adjacent cells' UE.

The interference measurement control message in block 301 indicates a sub-frame on which interference measurement is to be performed. In a specific implementation, the interference measurement control message may indicate the number of sub-frame on which interference measurement is to be performed, or the interference measurement control message may indicate new TDD uplink and downlink configuration, so that the UE may compare the current TDD uplink and downlink configuration with the new TDD uplink and downlink configuration to determine the number of sub-frame on which interference measurement is to be performed.

Block 302: the UE measures the interference of adjacent cells' UE on the specific sub-frame after receiving the interference measurement control message of adjacent cells from the eNB.

If the sub-frame on which interference measurement is to be performed is indicated in block 301, the specific sub-frame in block 302 is the sub-frame indicated by the interference measurement control message of adjacent cells.

The specific sub-frame in block 302 is one or more uplink sub-frames in the current TDD uplink and downlink configuration.

A method for measuring the interference of adjacent cells' UE on the specific sub-frame described in block 302 includes that, the UE configures self as a receiving mode on the specific sub-frame, and measures the interference of adjacent cells. That is to say, the UE configures self as the receiving mode on some uplink sub-frames in the current TDD uplink and downlink configuration, and measures uplink interference of adjacent cells' UE.

Herein, the UE may measure a Receiving Signal Strength Indicator (RSSI) in whole receiving bandwidth.

In this block, an object of measuring the interference of adjacent cells' UE by the UE is to determine, after the current uplink transmission sub-frame is changed into a downlink transmission sub-frame, whether the UE of the current cell will be interfered seriously by the adjacent cells' UE when receiving downlink data; if no, the eNB may change the TDD uplink and downlink configuration according to the uplink and downlink service requirements.

Block 303: the UE transmits an interference measurement report to the eNB, so as to report the interference condition of adjacent cells to the eNB.

According to the method of the present invention, the interference measurement report transmitted by the UE may be an event-drive report, i.e., a report which can not be transmitted unless a certain condition is met, or a periodical report. The condition in the event-drive report may be implemented as follows: when the measured RSSI reaches a threshold, the UE transmits the interference measurement report to the eNB.

Block 304: the eNB transmits a signaling of changing the TDD uplink and downlink configuration to the UE. The signaling of changing the TDD uplink and downlink configuration may be a physical layer signaling or a high layer control signaling.

Block 305: the UE receives and transmits data according to the TDD uplink and downlink configuration indicated by the eNB.

The method of the present invention is applicable to a scenario in which the eNB is a Low Power Node, i.e., a Pico eNB or a Home eNB, and the adjacent eNBs are Macro eNBs.

In the method shown in FIG. 3, the interference measurement report transmitted by the UE to the eNB is used by the eNB to determine whether to change the current TDD uplink and downlink configuration. Besides, the interference measurement report has other purposes, which will be illustrated hereinafter in detail.

A first purpose: the interference measurement report may be taken as a reference by the eNB to determine whether to transmit a request of configuring a blank sub-frame or an ABS to adjacent eNBs.

After the interference measurement report indicates that, after the current uplink transmission sub-frame is changed into a downlink transmission sub-frame, the UE of the current cell is seriously interfered by the adjacent cells' UE when receiving downlink data, and the eNB transmits a request of configuring a blank sub-frame or an ABS to adjacent eNBs. After receiving the request of configuring the blank sub-frame or the ABS, the adjacent eNBs learn that the eNB has requirements of changing the TDD uplink and downlink configuration. If the adjacent eNBs configure the blank sub-frame or the ABS according to the request of the eNB, the sub-frame which will result in the interference between the uplink transmission and the downlink transmission may be configured as the blank sub-frame or the ABS, so as to avoid the interference between the uplink transmission and downlink transmission of adjacent cells after the eNB changes the TDD uplink and downlink configuration.

A second purpose: the interference measurement report may be taken as a reference by the eNB to determine whether to transmit a request of changing the TDD uplink and downlink configuration to the adjacent eNBs, where the request is used to notify the adjacent eNBs that the eNB is to change the TDD uplink and downlink configuration, and the adjacent eNBs may perform related operations based on this.

In the method of the present invention, through measuring the signal strength of an adjacent eNB transmitting the request, the eNB may determine whether there is serious uplink and downlink interference between adjacent cells after the eNB transmitting the request changes the TDD uplink and downlink configuration. A specific implementation includes that the eNB configures self as a receiving mode on a certain downlink sub-frame, and measures the signal strength of the adjacent eNB transmitting the request.

If a certain Pico eNB needs to change the TDD uplink and downlink configuration of the current cell, and according to the interference measurement report transmitted by the UE of the current cell, the interference with the UE of the current cell is small after the TDD uplink and downlink configuration is changed, the Pico eNB may transmit the request of changing the TDD uplink and downlink configuration to an adjacent macro eNB. After receiving the request of changing the TDD uplink and downlink configuration transmitted by the Pico eNB, the adjacent macro eNB configures self as the receiving mode in some downlink sub-frames of the current TDD uplink and downlink configuration, to measure the signal strength of the Pico eNB, and further evaluate the uplink and downlink interference between eNBs after the Pico eNB changes the TDD uplink and downlink configuration. If the evaluation result indicates that there is no serious uplink and downlink interference, the macro eNB may transmit a request ACK message to the Pico eNB. After receiving the request ACK message, the Pico eNB transmits a signaling of changing the TDD uplink and downlink configuration to the UE.

In the method of the present invention, the eNB may transmit the request of configuring the blank sub-frame or the ABS or the request of changing the TDD uplink and downlink configuration to the adjacent eNBs after receiving the interference measurement report transmitted by the UE in block 303 and before performing block 304. The request may contain new TDD uplink and downlink configuration.

The method of the present invention will be further illustrated with reference to an embodiment.

The embodiment is applied to a scenario of macro eNB ? Pico eNB, i.e., the Pico eNB is within the coverage scope of the macro eNB. At beginning, the TDD uplink and downlink configuration of the Pico eNB and the macro eNB is both TDD uplink and downlink configuration 1, i.e.,

| TDD uplink and downlink configuration | uplink and downlink conversion point period | sub-frame number | | | | | | | | | |
|---|---|---|---|---|---|---|---|---|---|---|---|
| | | 0 | 1 | 2 | 3 | 4 | 5 | 6 | 7 | 8 | 9 |
| 1 | 5 ms | D | S | U | U | D | D | S | U | U | D |

When the uplink and downlink service load of the Pico eNB is changed, e.g., when there is more downlink service requirements, the TDD uplink and downlink configuration of the Pico eNB may be reconfigured as TDD uplink and downlink configuration having more downlink sub-frames, e.g., TDD uplink and downlink configuration 2 as follows:

| TDD uplink and downlink configuration | uplink and downlink conversion point period | sub-frame number | | | | | | | | | |
|---|---|---|---|---|---|---|---|---|---|---|---|
| | | 0 | 1 | 2 | 3 | 4 | 5 | 6 | 7 | 8 | 9 |
| 2 | 5 ms | D | S | U | D | D | D | S | U | D | D |

Before changing the TDD uplink and downlink configuration, the interference of adjacent cells is measured first, to determine whether to change the TDD uplink and downlink configuration, or determine whether to trigger some operations at the network side, so as to configure some scenarios in which there is no uplink and downlink interference, and then the TDD uplink and downlink configuration of the Pico eNB is changed.

The process of measuring the interference of adjacent cells is as follows.

The Pico eNB transmits an interference measurement control message of adjacent cells to the UE of the current cell, to indicate the UE to measure the interference of adjacent cells' UE. Specifically, the Pico eNB transmits the interference measurement control message of adjacent cells to all users of the current cell.

In the interference measurement control message, the Pico eNB may indicate a sub-frame to be measured by the UE. In this embodiment, the Pico eNB may indicate the UE to measure sub-frames 3 and 8.

In the interference measurement control message, the Pico eNB may indicate a sub-frame to be measured by the UE through new TDD uplink and downlink configuration. In this embodiment, the Pico eNB may indicate the new TDD uplink and downlink configuration for the UE in the interference measurement control message of adjacent cells, i.e., the TDD uplink and downlink configuration 2. After receiving the indication of the new TDD uplink and downlink configuration, the UE compares the new TDD uplink and downlink configuration with the current TDD uplink and downlink configuration, to determine to measure the interference of adjacent cells on sub-frames 3 and 8.

After receiving the interference measurement control message of adjacent cells from the Pico eNB, the UE configures one or more uplink sub-frames in the TDD uplink and downlink configuration indicated by the message to measure the interference of adjacent cells' UE. In this embodiment, the method for measuring the interference of adjacent cells' UE includes that the UE configures self as a receiving mode on the indicated sub-frame, i.e., a downlink mode, and measures the uplink interference of adjacent cells. The UE may measure a Receiving Signal Strength Indicator (RSSI) in whole receiving bandwidth.

After measuring the interference of adjacent cells, the UE transmits an interference measurement report to the Pico eNB. The interference measurement report may be an event-drive report or a periodical report. The event-drive report may be implemented as follows: when the measured RSSI reaches a threshold, the UE transmits the interference measurement report to the eNB.

After receiving the interference measurement report, the Pico eNB may determine, according to the interference condition reported by the UE, whether to change the current TDD uplink and downlink configuration. If yes, the Pico eNB transmits a signaling of changing the TDD uplink and downlink configuration to the UE.

In another method of the present invention, after receiving the interference measurement report, the Pico eNB transmits a request of changing the TDD uplink and downlink configuration or a request of configuring a blank sub-frame or an ABS to the macro eNB.

After receiving the request from the Pico eNB, the macro eNB transmits, according to the current condition, an ACK message of changing the TDD uplink and downlink configuration to the Pico eNB, or configures some sub-frames as blank sub-frames and ABSes. In this embodiment, the macro eNB may configure sub-frames 3 and 8 as blank sub-frames and ABSes. Afterwards, the macro eNB transmits the ACK message of changing the TDD uplink and downlink configuration to the Pico eNB. An object of requesting the macro eNB to configure the blank sub-frames or ABSes includes that, if serious uplink and downlink interference is caused because the Pico eNB changes the TDD uplink and downlink configuration, the Pico eNB may request the macro eNB to configure some blank sub-frames or ABSes. After configuring some sub-frames as blank sub-frames or ABSes, the macro eNB transmits the ACK message of changing the TDD uplink and downlink configuration to the Pico eNB. In this way, serious interference will not be caused when the Pico eNB changes the TDD uplink and downlink configuration.

Figure 4:
FIG. 4 is a schematic diagram illustrating an instance that a Pico eNB changes TDD uplink and downlink configuration according to an embodiment of the present invention.
Figure 4:
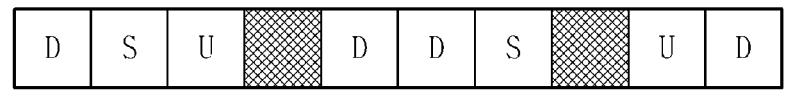
Figure 4:
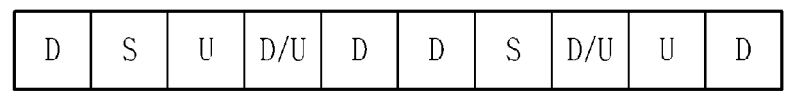

After receiving the ACK message of changing the TDD uplink and downlink configuration from the macro eNB, the Pico eNB transmits a signaling of changing the TDD uplink and downlink configuration to the UE. The signaling may be a high layer signaling or a physical layer signaling. If the macro eNB configures blank sub-frames and transmits the ACK message of changing the TDD uplink and downlink configuration to the Pico eNB, the Pico eNB may transmits a physical layer control signaling to the UE to dynamical change the current TDD uplink and downlink configuration. In this embodiment, when the macro eNB configures sub-frames 3 and 8 as ABSes and transmits the ACK message of changing the TDD uplink and downlink configuration to the Pico eNB, there is no uplink and downlink interference between a Pico cell and a macro cell on the sub-frames 3 and 8 no matter what direction on which transmission is performed in the Pico cell. In this way, the Pico eNB may transmit a physical layer signaling to the UE, to dynamically change the transmission direction of sub-frames 3 and 8. The UE dynamically changes the transmission direction of sub-frames 3 and 8 according to the physical layer signaling transmitted by the Pico eNB, and receives and transmits data, which is shown in FIG. 4.

The foregoing is only preferred embodiments of the present invention and is not used to limit the protection scope of the present invention. Any modification, equivalent substitution and improvement without departing from the spirit and principle of the present invention are within the protection scope of the present invention.

The invention claimed is:

1. A method for changing time division duplex uplink and downlink (TDD UL-DL) configuration by a terminal configured with a first TDD UL-DL configuration, comprising:
   a) receiving an interference measurement control message from a base station, wherein the interference measurement control message includes a configuration indicating a sub-frame on which interference measurement is to be performed;
   b) measuring interference of adjacent cells on the sub-frame;
   c) transmitting an interference measurement report to the base station;
   d) receiving a signaling of changing the TDD UL-DL configuration to a second TDD UL-DL configuration from the base station if the changing of the TDD UL-DL configuration is determined by the base station based on the interference measurement report; and
   e) receiving and transmitting data based on the second TDD UL-DL configuration.

2. The method of claim 1, wherein the interference measurement control message further includes a sub-frame number for indicating the sub-frame on which interference measurement is to be performed, and the sub-frame on which the interference measurement is to be performed is an uplink sub-frame in the first TDD UL-DL configuration and is a downlink sub-frame in the second TDD UL-DL configuration.

3. The method of claim 1, wherein the step b) comprises:
   configuring a receiving mode on the sub-frame on which the interference measurement is to be performed, and measuring the interference of the adjacent cells, and
   wherein the terminal measures a receiving signal strength indicator (RSSI) in a receiving bandwidth.

4. The method of claim 1, wherein
   in the step c), the interference measurement report transmitted by the terminal to the base station is an event-drive report or a periodical report, and
   wherein in the step d), the signaling of changing the TDD UL-DL configuration is a physical layer signaling or a high layer signaling.

5. The method of claim 1, wherein
   the base station is a Pico base station or a home base station;
   after the step c) and before the step d),
   a request of configuring a blank sub-frame or an almost blank sub-frame (ABS) is transmitted by the base station to an adjacent macro base station, and a request ACK message is transmitted by the adjacent macro base station to the base station.

6. The method of claim 1, wherein
   the base station is a Pico base station or a home base station;
   after the step c) and before the step d),
   a request of changing the TDD UL-DL configuration is transmitted by the base station to an adjacent macro base station, the request including the second TDD UL-DL configuration, and a request ACK message is transmitted by the adjacent macro base station to the base station.

7. A terminal, for changing time division duplex uplink and downlink (TDD UL-DL) configuration, configured with a first TDD UL-DL configuration, comprising:
   a transceiver configured to transmit and receive a signal; and
   a control unit configured to:
   a) control reception of an interference measurement control message from a base station, wherein the interference measurement control message includes a configuration indicating a sub-frame on which interference measurement is to be performed,
   b) measure interference of adjacent cells on the sub-frame,
   c) control transmission of an interference measurement report to the base station,
   d) control reception of a signaling of changing the TDD UL-DL configuration to a second TDD UL-DL configuration from the base station if the changing of the TDD UL-DL configuration is determined by the base station based on the interference measurement report, and
   e) control reception and transmission of data based on the second TDD UL-DL configuration.

8. The terminal of claim 7, wherein the interference measurement control message further includes a sub-frame number for indicating the sub-frame on which the interference measurement is to be performed, and
   the sub-frame on which the interference measurement is to be performed is an uplink sub-frame in the first TDD UL-DL configuration and is a downlink sub-frame in the second TDD UL-DL configuration.

9. The terminal of claim 7, wherein the control unit is configured to:
   configure a receiving mode on the sub-frame on which the interference measurement is to be performed, and measure the interference of the adjacent cells, and
   wherein the terminal measures a receiving signal strength indicator (RSSI) in a receiving bandwidth.

10. The terminal of claim 7, wherein the interference measurement report transmitted by the terminal to the base station is an event-drive report or a periodical report, and
    wherein the signaling of changing the TDD UL-DL configuration is a physical layer signaling or a high layer signaling.

11. The terminal of claim 7, wherein
    the base station is a Pico base station or a home base station; and
    after the step c) and before the step d), a request of configuring a blank sub-frame or an almost blank sub-frame (ABS) is transmitted by the base station to an adjacent macro base station, and a request ACK message is transmitted by the adjacent macro base station to the base station.

12. The terminal of claim 7 wherein
the base station is a Pico base station or a home base station; and
after the step c) and before the step d), a request of changing the TDD UL-DL configuration is transmitted by the base station to an adjacent macro base station, the request including the second TDD UL-DL configuration, and a request ACK message is transmitted by the adjacent macro base station to the base station.

13. A method for changing time division duplex uplink and downlink (TDD UL-DL) configuration by a base station, comprising:
   a) transmitting an interference measurement control message to a terminal configured with a first TDD UL-DL configuration, wherein the interference measurement control message includes a configuration indicating a sub-frame on which interference measurement is to be performed;
   b) receiving an interference measurement report from the terminal, wherein the interference measurement report is based on interference of adjacent cells measured on the sub-frame;
   c) determining, based on the interference measurement report, whether to change the TDD UL-DL configuration to a second TDD UL-DL configuration;
   d) transmitting a signaling of changing the TDD UL-DL configuration to the second TDD UL-DL configuration to the terminal if the changing of the TDD UL-DL configuration is determined; and
   e) receiving and transmitting data based on the second TDD UL-DL configuration.

14. The method of claim 13, wherein the interference measurement control message further includes a sub-frame number for indicating the sub-frame on which the interference measurement is to be performed, and
the sub-frame on which the interference measurement is to be performed is an uplink sub-frame in the first TDD UL-DL configuration and is a downlink sub-frame in the second TDD UL-DL configuration.

15. The method of claim 13, wherein
the interference measurement report transmitted by the terminal to the base station is an event-drive report or a periodical report, and
wherein the signaling of the changing of the TDD UL-DL configuration is a physical layer signaling or a high layer signaling.

16. The method of claim 13, wherein
the base station is a Pico base station or a home base station; and
further comprising:
transmitting a request of configuring a blank sub-frame or an almost blank sub-frame (ABS) to an adjacent macro base station, and receiving a request ACK message from the adjacent macro base station.

17. The method of claim 13, wherein
the base station is a Pico base station or a home base station; and
further comprising:
transmitting a request of changing the TDD UL-DL configuration to an adjacent macro base station, the request including the second TDD UL-DL configuration, and receiving a request ACK message from the adjacent macro base station.

18. A base station for changing time division duplex uplink and downlink (TDD UL-DL) configuration, comprising:
   a transceiver configured to transmit and receive a signal; and
   a control unit configured to:
   a) control transmission of an interference measurement control message to a terminal configured with a first TDD UL-DL configuration, wherein the interference measurement control message includes a configuration indicating a sub-frame on which interference measurement is to be performed,
   b) control reception of an interference measurement report from the terminal, wherein the interference measurement report is based on interference of adjacent cells measured on the sub-frame,
   c) determine, based on the interference measurement report, whether to change the TDD UL-DL configuration to a second TDD UL-DL configuration,
   d) control transmission of a signaling of changing the TDD UL-DL configuration to the second TDD UL-DL configuration to the terminal if the changing of the TDD UL-DL configuration is determined, and
   e) control reception and transmission of data based on the second TDD UL-DL configuration.

19. The base station of claim 18, wherein the interference measurement control message further includes a sub-frame number for indicating the sub-frame on which the interference measurement is to be performed, and
the sub-frame on which the interference measurement is to be performed is an uplink sub-frame in the first TDD UL-DL configuration and is a downlink sub-frame in the second TDD UL-DL configuration.

20. The base station of claim 18, wherein
the interference measurement report transmitted by the terminal to the base station is an event-drive report or a periodical report, and
wherein the signaling of the changing of the TDD UL-DL configuration is a physical layer signaling or a high layer signaling.

21. The base station of claim 18, wherein
the base station is a Pico base station or a home base station; and
the control unit is further configured to:
control transmission of a request of configuring a blank sub-frame or an almost blank sub-frame (ABS) to an adjacent macro base station, and reception of a request ACK message from the adjacent macro base station.

22. The base station of claim 18, wherein
the base station is a Pico base station or a home base station; and
the control unit is further configured to:
control transmission of a request of changing the TDD UL-DL configuration to an adjacent macro base station, the request including the second TDD UL-DL configuration, and reception of a request ACK message from the adjacent macro base station.

* * * * *